United States Patent
Su et al.

(10) Patent No.: US 11,916,349 B2
(45) Date of Patent: Feb. 27, 2024

(54) DEVICE AND METHOD FOR MEASURING THERMAL LOAD CAUSED BY ENERGY TRANSFER UPCONVERSION IN LASER GAIN CRYSTAL

(71) Applicant: Shanxi University, Taiyuan (CN)

(72) Inventors: Jing Su, Taiyuan (CN); Huiqi Yang, Taiyuan (CN); Huadong Lu, Taiyuan (CN); Kunchi Peng, Taiyuan (CN)

(73) Assignee: Shanxi University

( * ) Notice: Subject to any disclaimer, the term of this patent is extended or adjusted under 35 U.S.C. 154(b) by 802 days.

(21) Appl. No.: 17/038,432

(22) Filed: Sep. 30, 2020

(65) Prior Publication Data

US 2021/0164850 A1    Jun. 3, 2021

(30) Foreign Application Priority Data

Dec. 2, 2019    (CN) .......................... 201911212703.X

(51) Int. Cl.
| | |
|---|---|
| *H01S 3/04* | (2006.01) |
| *H01S 3/08* | (2023.01) |
| *H01S 3/00* | (2006.01) |
| *H01S 3/16* | (2006.01) |
| *H01S 3/08031* | (2023.01) |

(Continued)

(52) U.S. Cl.
CPC ........ *H01S 3/08072* (2013.01); *H01S 3/0014* (2013.01); *H01S 3/0405* (2013.01); *H01S 3/08031* (2013.01); *H01S 3/1022* (2013.01); *H01S 3/1611* (2013.01); *H01S 3/1673* (2013.01); *G01K 17/003* (2013.01); *H01S 3/042* (2013.01); *H01S 3/0816* (2013.01)

(58) Field of Classification Search
CPC .. H01S 3/08072; H01S 3/0014; H01S 3/0405; H01S 3/08031; H01S 3/1022; H01S 3/1611; H01S 3/1673; H01S 3/042; H01S 3/0816; G01K 17/003
See application file for complete search history.

(56) References Cited

U.S. PATENT DOCUMENTS

| | | | | |
|---|---|---|---|---|
| 4,942,582 A | * | 7/1990 | Kintz .................. | H01S 3/09415 372/18 |
| 5,682,397 A | * | 10/1997 | Scheps .............. | H01S 3/094034 372/71 |

(Continued)

*Primary Examiner* — Kinam Park
(74) *Attorney, Agent, or Firm* — Lambert Shortell & Connaughton; David J. Connaughton, Jr.; Justin P. Tinger

(57) ABSTRACT

A device and a method for measuring a thermal load caused by energy transfer upconversion in a laser gain crystal. Increasing the pump power multiple times so that the power meter obtains multiple thresholds for a single-frequency laser; obtaining an average pump threshold of the output laser; obtaining cavity parameters of the single-frequency laser; obtaining thermal focal lengths on the tangential and sagittal planes of the laser gain crystal inside the single-frequency laser; obtaining individual ABCD matrices of the laser system on the tangential and the sagittal planes; obtaining a thermal load at the threshold based on the ABCD transfer matrix of the laser gain crystal on the tangential plane, the ABCD transfer matrix of the laser gain crystal on the sagittal plane, and the average pump threshold of the laser system; obtaining a thermal load caused by ETU at threshold based on the thermal load at the threshold.

12 Claims, 3 Drawing Sheets

(51) Int. Cl.
  *H01S 3/102*  (2006.01)
  *G01K 17/00*  (2006.01)
  *H01S 3/081*  (2006.01)
  *H01S 3/042*  (2006.01)

(56)  References Cited

U.S. PATENT DOCUMENTS

| | | | | |
|---|---|---|---|---|
| 5,754,570 | A * | 5/1998 | Goh | H01S 3/17 |
| | | | | 372/39 |
| 9,680,281 | B2 * | 6/2017 | Xuan | H01S 3/1022 |
| 2011/0026103 | A1 * | 2/2011 | Suchowski | G02F 1/3534 |
| | | | | 117/11 |
| 2012/0312028 | A1 * | 12/2012 | Kashyap | F25B 23/00 |
| | | | | 62/3.1 |

* cited by examiner

DEVICE AND METHOD FOR MEASURING THERMAL LOAD CAUSED BY ENERGY TRANSFER UPCONVERSION IN LASER GAIN CRYSTAL

TECHNICAL FIELD

The present invention relates to the field of laser, and in particular, to a device and a method for measuring a thermal load caused by energy transfer upconversion (ETU) in a laser gain crystal.

BACKGROUND

As an important laser source, single-frequency 1342 nm lasers are widely used in fields such as optical fiber sensing, fiber optic communication, and laser medicine. The frequency-doubled 671 nm red lasers are widely used in high-precision laser spectra and ultra-cold atoms, laser medicine, OPO, and tunable pump sources. With the continuous development of science and technology, for example, in the fields of quantum entanglement and quantum communication, better signal-to-noise ratio and higher-level entanglement can be achieved when 1342/671 nm lasers with better performances and higher power output are used. Therefore, higher output power and better laser performances of 1342/671 nm lasers have always been the focuses of researches. However, the thermal effect of the laser gain crystal is much more serious than that of the 1064 nm laser, which severely limits the power increase of the fundamental frequency laser and the frequency-doubled laser. Thermal load is an important indicator corresponding to the degree of thermal effect of the laser gain crystal. To obtain single-frequency 1342/671 nm laser with higher power output and laser resonant cavity with more optimized design, it is necessary to analyze the thermal load of the laser gain medium before and after the laser output.

The traditional researches on the impact of ETU on the thermal load and laser output power at the laser gain crystal focus on the theoretical research and light probe technology. The theoretical research studies the thermal load caused by ETU based on the rate equation. This method requires complicated theoretical calculation and derivation. The probe light method studies the spectral distribution of the ETU and the thermal focal values by leaving the shaped probe light to transmit through a gain medium with the thermal focal effect and measuring the spectral distribution. However, the spectral distribution measurement results are greatly affected by the detector precision. With this method, the changes of the thermal lens can be directly presented, but an additional beam of laser needs to be introduced, and the measurement accuracy is too low to accurately reflect the severity of the crystal thermal effects.

SUMMARY

The present invention provides a device and a method for measuring a thermal load caused by energy transfer upconversion (ETU) in a laser gain crystal, which feature easy operation and accurate results.

According to specific examples provided by the present invention, the present invention discloses the following technical effects.

To achieve the above purpose, the present invention provides the following technical solutions.

A device for measuring a thermal load caused by ETU in a laser gain crystal includes a single-frequency laser and a power meter, where output single-frequency laser is injected into the power meter, and can be viewed through and measured by the power meter.

Optionally, the single-frequency laser includes a laser gain crystal.

Optionally, the laser gain crystal is an Nd:YVO$_4$ crystal.

Optionally, an optical resonant cavity of the single-frequency laser is a standing-wave cavity or a traveling-wave cavity.

A method for measuring a thermal load caused by ETU in a laser gain crystal is provided, where the method uses the above device for measuring a thermal load caused by ETU in a laser gain crystal, and includes the following steps:

increasing pump power multiple times to obtain multiple laser emission thresholds for the single-frequency laser;

obtaining an average pump threshold of the laser system;

obtaining cavity parameters of the single-frequency laser;

obtaining thermal focal lengths on the tangential plane and sagittal plane of the laser gain crystal inside the single-frequency laser by substituting the average pump threshold of the output laser and the cavity parameters into formulas for the thermal focal lengths on the tangential plane and the sagittal plane;

obtaining individual ABCD matrices of the laser gain crystal on the tangential plane and the sagittal plane based on the thermal focal length on the tangential plane, the thermal focal length on the sagittal plane, and the cavity parameters;

obtaining a thermal load at threshold based on the ABCD transfer matrix of the laser gain crystal on the tangential plane, the ABCD transfer matrix of the laser gain crystal on the sagittal plane, the average pump threshold of the laser system, and matrices conditions of stability ranges; and obtaining a thermal load caused by ETU at threshold based on the whole thermal load at threshold.

Optionally, the obtaining thermal focal lengths on the tangential and sagittal planes of the laser gain crystal inside the single-frequency laser by substituting the average pump threshold of the laser system and the cavity parameters into formulas for the thermal focal lengths on the tangential plane and the sagittal plane specifically includes:

obtaining the thermal focal length $f_{t(thermal)}$ on the tangential plane of the laser gain crystal according to the formula for the thermal lens of the laser gain crystal on the tangential plane $$f_{t(thermal)} = \frac{\pi K_{\parallel c} \omega_p^2}{\xi P_P \frac{dn}{dT}[1 - \exp(-\alpha l)]};$$

and obtaining the thermal focal length on the sagittal plane of the laser gain crystal according to the formula for the thermal lens of the laser gain crystal on the sagittal plane $$f_{s(thermal)} = \frac{\pi K_{\perp c} \omega_p^2}{\xi P_P \left(\frac{dn}{dT} + 0.85 \times 10^{-6}\right)[1 - \exp(-\alpha l)]},$$

where $K_{\parallel c}$ and $K_{\perp c}$ represent the thermal conductivity coefficients, which were parallel and perpendicular to the optical axis, respectively, $\omega_P$ represents the spot size of the pump laser at the laser crystal, $\xi$ represents the thermal load, $P_P$ represents the pump power injected into the laser crystal, $$\frac{dn}{dT}$$

represents the thermo-optic coefficient of the laser crystal, $\alpha$ represents the pump laser absorption coefficient of the laser crystal, l represents the effective length of a doped part of the laser gain crystal, $f_{t(thermal)}$ represents the thermal focal length on the tangential plane of the laser gain crystal, and $f_{s(thermal)}$ represents the thermal focal length on the sagittal plane of the laser gain crystal.

Optionally, the obtaining individual ABCD matrices of the laser gain crystal on the tangential plane and the sagittal plane based on the thermal focal length on the tangential plane, the thermal focal length on the sagittal plane, and the cavity parameters specifically includes:

obtaining the ABCD transfer matrix $$\begin{pmatrix} A_t & B_t \\ C_t & D_t \end{pmatrix}$$

of the laser system on the tangential plane based on the thermal focal length on the tangential plane and the cavity parameters by using the formula $$\begin{pmatrix} A_t & B_t \\ C_t & D_t \end{pmatrix} = \begin{pmatrix} a_t & b_t \\ c_t & d_t \end{pmatrix} \begin{pmatrix} 1 & 0 \\ -\frac{1}{f_{t(thermal)}} & 1 \end{pmatrix};$$

and
obtaining the ABCD transfer matrix $$\begin{pmatrix} A_s & B_s \\ C_s & D_s \end{pmatrix}$$

of the laser gain crystal on the sagittal plane based on the thermal focal length on the sagittal plane and the cavity parameters by using the formula $$\begin{pmatrix} A_s & B_s \\ C_s & D_s \end{pmatrix} = \begin{pmatrix} a_s & b_s \\ c_s & d_s \end{pmatrix} \begin{pmatrix} 1 & 0 \\ -\frac{1}{f_{s(thermal)}} & 1 \end{pmatrix},$$

where $$\begin{pmatrix} A_t & B_t \\ C_t & D_t \end{pmatrix}$$

represents the ABCD transfer matrices of the laser system on the tangential plane, $$\begin{pmatrix} A_s & B_s \\ C_s & D_s \end{pmatrix}$$

represents the ABCD transfer matrices of the laser system on the sagittal plane, $f_{t(thermal)}$ represents the thermal focal length on the tangential plane of the laser gain crystal, $f_{s(thermal)}$ represents the thermal focal length on the sagittal plane of the laser gain crystal, $$\begin{pmatrix} a_t & b_t \\ c_t & d_t \end{pmatrix}$$

is an expression for the remaining optical transmission matrix on the tangential plane; and $$\begin{pmatrix} a_s & b_s \\ c_s & d_s \end{pmatrix}$$

is an expression for the remaining optical transmission matrix on the sagittal plane.

Optionally, obtaining a thermal load at threshold based on the ABCD transfer matrix of the laser gain crystal on the tangential plane, the ABCD transfer matrix of the laser gain crystal on the sagittal plane, the average pump threshold of the laser system, and matrices conditions of stability ranges specifically includes:

when the single-frequency laser is in the stability ranges on both the tangential plane and sagittal plane, obtaining the thermal load at threshold based on the ABCD transfer matrices of the laser system on the tangential plane, the ABCD transfer matrices of the laser system on the sagittal plane, and the average pump threshold of the laser system.

Optionally, the obtaining a thermal load caused by ETU at threshold based on the thermal load at threshold specifically includes:

obtaining the thermal load caused by ETU at threshold $\xi_{ETU}$ based on the thermal load at threshold by using the formula $$\xi_{ETU} = \frac{\lambda_f}{\lambda_P}\left[\xi_{nolasing} - \left(1 - \frac{\lambda_P}{\lambda_f}\right)\right],$$

where
$\lambda_P$ represents the wavelength of the pump laser, $\lambda_f$ represents the wavelength of average fluorescence, $\xi_{ETU}$ represents the thermal load caused by ETU, and $\xi_{nolasing}$ represents the thermal load before the laser is emitted.

The present invention provides the following technical effects:

The present invention can obtain the thermal load caused by ETU in the laser gain crystal under the pump power by measuring the threshold of the laser system. This measurement method features a simple process and accurate results, with no need to analyze the complicated thermal process in the crystal or introduce other optical systems.

BRIEF DESCRIPTION OF DRAWINGS

To describe the technical solutions in the examples of the present invention or in the prior art more clearly, the following briefly describes the accompanying drawings required for the examples. Apparently, the accompanying drawings in the following description show merely some examples of the present invention, and a person of ordinary skill in the art may still derive other accompanying drawings from these accompanying drawings without creative efforts.

DETAILED DESCRIPTION

The following clearly and completely describes the technical solutions in the examples of the present invention with reference to accompanying drawings in the examples of the present invention. Apparently, the described examples are merely a part rather than all of the examples of the present invention. All other examples obtained by a person of ordinary skill in the art based on the examples of the present invention without creative efforts shall fall within the protection scope of the present invention.

The present invention provides a device and a method for measuring a thermal load caused by ETU in a laser gain crystal, which feature easy operation and accurate results.

In order to make the above objectives, features, and advantages of the present invention more understandable, the present invention will be described in further detail below with reference to the accompanying drawings and detailed examples.

Figure 1:
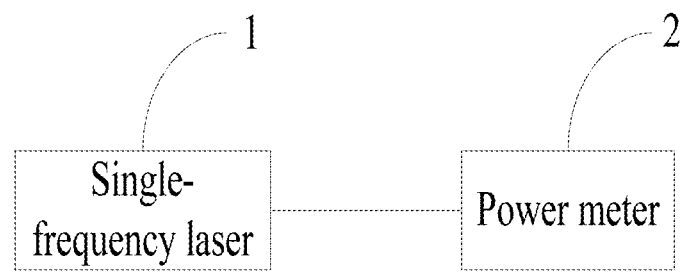
FIG. 1 is a composition diagram of a device for measuring a thermal load caused by ETU in a laser gain crystal according to the present invention.

FIG. 1 is a composition diagram of a device for measuring a thermal load caused by ETU in a laser gain crystal according to the present invention. As shown in FIG. 1, the device for measuring a thermal load caused by ETU in a laser gain crystal includes: a single-frequency laser 1 and a power meter 2. The laser output from the single-frequency laser 1 is injected into the power meter 2. The output power of the laser can be viewed through and measured by the power meter. The single-frequency laser 1 includes a laser gain crystal. The laser gain crystal is an Nd:YVO$_4$ crystal. A laser cavity of the single-frequency laser 1 could be a standing-wave cavity or a traveling-wave cavity.

The device for measuring a thermal load caused by ETU in a laser gain crystal according to the present invention includes a single-frequency laser and a power meter. Only one power meter is used to test the operating status of the laser.

Figure 2:
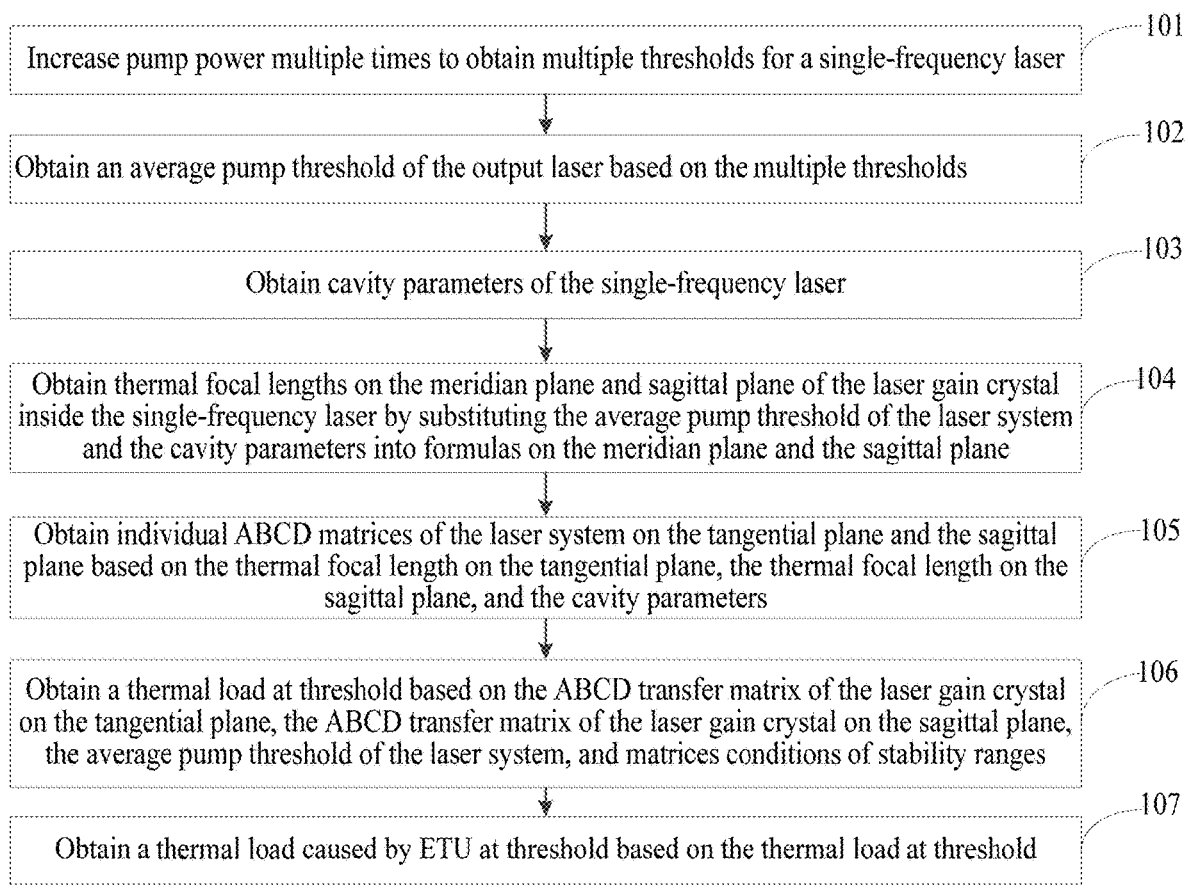
FIG. 2 is a flowchart of a method for measuring a thermal load caused by ETU in a laser gain crystal according to the present invention.

FIG. 2 is a flowchart of a method for measuring a thermal load caused by ETU in a laser gain crystal according to the present invention. As shown in FIG. 2, the method for measuring a thermal load caused by ETU in a laser gain crystal uses the device for measuring a thermal load caused by ETU in a laser gain crystal, and includes the following steps:

Step 101: Increase pump power multiple times to obtain multiple thresholds for the single-frequency laser.

Step 102: Obtain an average pump threshold of the output laser based on the obtained multiple thresholds.

Step 103: Obtain cavity parameters of the single-frequency laser.

Step 104: Obtain thermal focal lengths on the tangential plane and sagittal plane of the laser gain crystal inside the single-frequency laser by substituting the average pump threshold and the cavity parameters into formulas for the thermal focal lengths on the tangential plane and the sagittal plane. This step specifically includes:

obtaining the thermal focal length $f_{t(thermal)}$ on the tangential plane of the laser gain crystal according to the formula for the thermal lens of the laser gain crystal on the tangential plane $$f_{t(thermal)} = \frac{\pi K_{\parallel c} \omega_p^2}{\xi P_P \frac{dn}{dT}[1-\exp(-\alpha l)]};$$

and obtaining the thermal focal length on the sagittal plane of the laser gain crystal according to the formula for the thermal lens of the laser gain crystal on the sagittal plane $$f_{s(thermal)} = \frac{\pi K_{\perp c} \omega_p^2}{\xi P_P \left(\frac{dn}{dT} + 0.85 \times 10^{-6}\right)[1-\exp(-\alpha l)]},$$

where $K_{\parallel c}$ and $K_{\perp c}$ represent the thermal conductivity coefficients, which were parallel and perpendicular to the optical axis, respectively, $\omega_P$ represents the spot size of the pump laser at the laser crystal, $\xi$ represents the thermal load, $P_P$ represents the pump threshold of the laser system, $$\frac{dn}{dT}$$

represents the thermo-optic coefficient of the laser crystal, $\alpha$ represents the pump laser absorption coefficient of the laser crystal, l represents the effective length of a doped part of the laser gain crystal $f_{t(thermal)}$, represents the thermal focal length on the tangential plane of the laser gain crystal, and $f_{s(thermal)}$ represents the thermal focal length on the sagittal plane of the laser gain crystal.

Step 105: Obtain individual ABCD matrices of the laser system on the tangential plane and the sagittal plane based on the thermal focal length on the tangential plane, the thermal focal length on the sagittal plane, and the cavity parameters. This step specifically includes:

obtaining the ABCD transfer matrix $$\begin{pmatrix} A_t & B_t \\ C_t & D_t \end{pmatrix}$$

of the laser system on the tangential plane based on the thermal focal length on the tangential plane and the cavity parameters by using the formula $$\begin{pmatrix} A_t & B_t \\ C_t & D_t \end{pmatrix} = \begin{pmatrix} a_t & b_t \\ c_t & d_t \end{pmatrix} \begin{pmatrix} 1 & 0 \\ -\frac{1}{f_{t(thermal)}} & 1 \end{pmatrix};$$

and
obtaining the ABCD transfer matrix $$\begin{pmatrix} A_s & B_s \\ C_s & D_s \end{pmatrix}$$

of the laser gain crystal on the sagittal plane based on the thermal focal length on the sagittal plane and the cavity parameters by using the formula $$\begin{pmatrix} A_s & B_s \\ C_s & D_s \end{pmatrix} = \begin{pmatrix} a_s & b_s \\ c_s & d_s \end{pmatrix} \begin{pmatrix} 1 & 0 \\ -\frac{1}{f_{s(thermal)}} & 1 \end{pmatrix}.$$

where $$\begin{pmatrix} A_t & B_t \\ C_t & D_t \end{pmatrix}$$

represents the ABCD transfer matrix of the laser gain crystal on the tangential plane, $$\begin{pmatrix} A_s & B_s \\ C_s & D_s \end{pmatrix}$$

represents the ABCD transfer matrix of the laser gain crystal on the sagittal plane, $f_{t(thermal)}$ represents the thermal focal length on the tangential plane of the laser gain crystal, $f_{s(thermal)}$ represents the thermal focal length on the sagittal plane of the laser gain crystal, $$\begin{pmatrix} a_t & b_t \\ c_t & d_t \end{pmatrix}$$

is an expression for the remaining optical transmission matrices on the tangential plane; and $$\begin{pmatrix} a_s & b_s \\ c_s & d_s \end{pmatrix}$$

is an expression for the remaining optical transmission matrices on the sagittal plane.

Step 106: Obtain a thermal load at threshold based on the ABCD transfer matrix of the laser gain crystal on the tangential plane, the ABCD transfer matrix of the laser gain crystal on the sagittal plane, the average pump threshold of the laser system, and matrices conditions of stability ranges. This step specifically includes:

when the single-frequency laser is in the stability ranges on both the tangential plane and sagittal plane, that is, $|A_t+D_t|\leq 2$ & $|A_s+D_s|\leq 2$, obtaining the thermal load at threshold based on the ABCD transfer matrix of the laser system on the tangential plane and the ABCD transfer matrix of the laser gain crystal on the sagittal plane.

Step 107: Obtain a thermal load caused by ETU at threshold based on the thermal load at threshold. This step specifically includes:

obtaining the thermal load caused by ETU at threshold $\xi_{ETU}$ based on the thermal load at threshold by using the formula $$\xi_{ETU} = \frac{\lambda_f}{\lambda_P}\left[\xi_{nolasing} - \left(1 - \frac{\lambda_P}{\lambda_f}\right)\right],$$

where
$\lambda_P$ represents the wavelength of the pump laser, $\lambda_f$ represents the wavelength of the average fluorescence, $\xi_{ETU}$ represents the thermal load caused by ETU, and $\xi_{noising}$ represents the thermal load before the laser is emitted.

The present invention provides a method for measuring a thermal load caused by ETU in a laser gain crystal. The principle is as follows: For the 1342 nm laser generated by an Nd:YVO$_4$ laser crystal, serious thermal effects exist and the thermal effects greatly differ with and without laser output. The obvious changes in the thermal effects will have impact on the stability of the laser resonant cavity. Conversely, the thermal load caused by ETU in the laser gain crystal at the threshold can be deduced from the laser cavity change reflected by the change in the laser output power.

When the pump wavelength is 880 nm and no laser radiation is produced, as the pump power increases, there is no ESA energy level for particles of the upper energy level, so the ESA effect before lasing is not considered. The thermal load of the laser gain crystal mainly comes from quantum defects and ETU. Record the pump threshold power when the pump power is increased. According to the ABCD transmission matrices of the laser cavity $$\begin{pmatrix} A_t & B_t \\ C_t & D_t \end{pmatrix} = \begin{pmatrix} a_t & b_t \\ c_t & d_t \end{pmatrix} \begin{pmatrix} 1 & 0 \\ -\frac{1}{f_{t(thermal)}} & 1 \end{pmatrix} \quad (1)$$

$$\begin{pmatrix} A_s & B_s \\ C_s & D_s \end{pmatrix} = \begin{pmatrix} \partial_s & b_s \\ c_s & d_s \end{pmatrix} \begin{pmatrix} 1 & 0 \\ -\frac{1}{f_{s(thermal)}} & 1 \end{pmatrix} \quad (2)$$

and formulas for the thermal lens $$f_{t(thermal)} = \frac{\pi K_{\|c} \omega_p^2}{\xi P_p \frac{dn}{dT}[1 - \exp(-\alpha l)]} \quad (3)$$

$$f_{s(thermal)} = \frac{\pi K_{\perp c} \omega_p^2}{\xi P_p \left(\frac{dn}{dT} + 0.85 \times 10^{-6}\right)[1 - \exp(-\alpha l)]} \quad (4)$$

for a certain laser cavity, the distance between the lenses and a radius of curvature of the lenses are known. When $$|A_t+D_t|\leq 2 \ \& \ |A_s+D_s|\leq 2 \quad (5)$$

that is, when the laser system enters stability ranges on both the tangential plane and the sagittal plane, the oscillating laser is emitted, and the thermal load at threshold can be obtained.

Then, according to the expression for the thermal load before lasing $$\xi_{nolasing} = (1 - \xi_{ETU})\left(1 - \frac{\lambda_P}{\lambda_f}\right) + \xi_{ETU} \quad (6)$$

an expression for the thermal load caused by ETU before the lasering is obtained:

$$\xi_{ETU} = \frac{\lambda_f}{\lambda_P}\left[\xi_{nolasing} - \left(1 - \frac{\lambda_P}{\lambda_f}\right)\right] \quad (7)$$

Then, the thermal load caused by ETU at the threshold $\xi_{ETU}$ at this time can be obtained.

According to the present invention, the thermal load caused by ETU of the laser gain crystal is calculated based on the recorded stable pump threshold of the laser system by using the formula.

Compared with the prior art, the present invention has the following advantages:

1. The present invention can obtain the thermal load caused by ETU in the laser gain crystal under the pump power by measuring the pump threshold of the laser system. This measurement method features a simple process and accurate results, with no need to analyze the complicated thermal process in the crystal or introduce other optical systems.

2. The present invention is applicable to the thermal effect measurement of any gain crystal with the ETU thermal effect.

3. The present invention is applicable to the thermal load caused by ETU measurement in laser gain crystals in different cavity structures.

4. Based on the measurement of thermal load caused by ETU in the laser gain crystal, the present invention can further analyze the impact of the transmittance of the output coupling lens on the thermal load caused by ETU, providing a good reference for further increasing the output power of the laser.

In short, the present invention can accurately measure the thermal load caused by ETU in the Nd:YVO$_4$ crystal or other laser gain crystals with the ETU thermal effect, as well as the thermal load changes under different transmittances. The device is simple and easy-to-use.

Example 1

Figure 3:
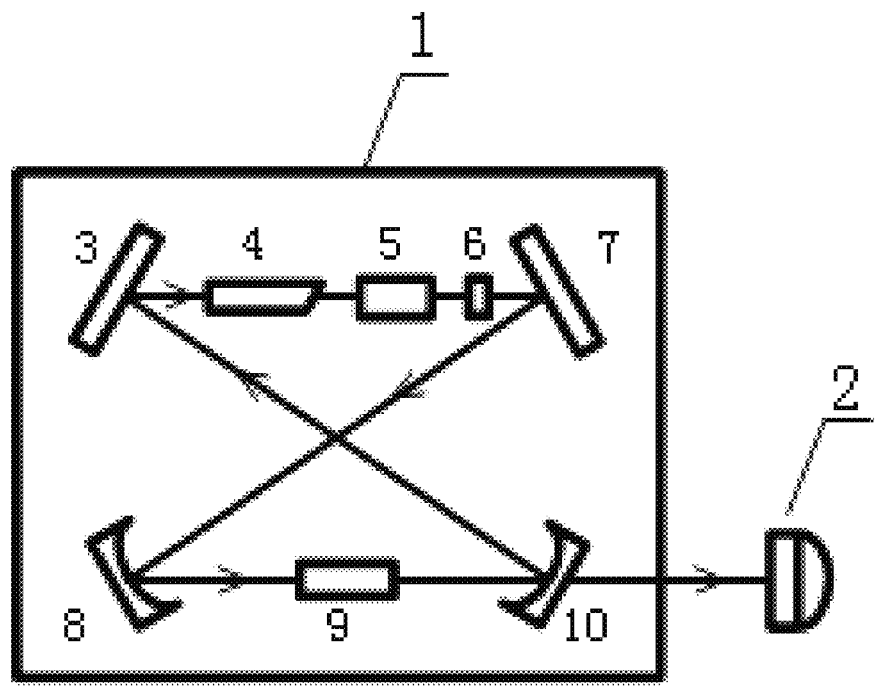
FIG. 3 is a structural diagram of a device for measuring a thermal load caused by ETU in a laser gain crystal in an 8-shaped ring cavity according to the present invention.

FIG. 3 is a structural diagram of a device for measuring a thermal load caused by ETU in a laser gain crystal in an 8-shaped ring cavity according to the present invention. The device includes a single-frequency laser 1 and a power meter 2. The tested laser gain crystal covered with indium foil is placed in a temperature-controlled red copper oven through vacuum indium welding, and then placed in a laser resonant cavity. The temperature-controlled oven uses a thermoelectric cooler (TEC) for temperature control, with a temperature control accuracy of 0.1° C. The single-frequency laser 1 has an 8-shaped ring structure. An isolator is added to the ring cavity to realize the unidirectional transmission of the laser in the resonant. As shown in FIG. 3, the single-frequency laser 1 includes a first concave-convex lens 3, an Nd:YVO$_4$ laser crystal 4, a TGG magneto-optical crystal 5, a half-wave plate 6, a first plano-convex lens 7, a first plano-concave lens 8, a second plano-concave lens 10, and a frequency-doubling crystal 9. The first plano-convex lens 3, the first plano-convex lens 7, the first plano-concave lens 8, and the second plano-concave lens 10 are four optical lenses forming the ring cavity. The TGG magneto-optical crystal 5 and the half-wave plate 6 together form the isolator. The TGG magneto-optical crystal 5 is a TGG magneto-optical crystal surrounded by a permanent magnet. The first concave-convex lens 3 is coated with a film that is high transmission to the pump laser and high reflection to the oscillating laser, and is an input coupler of the single-frequency laser 1. The first plano-convex lens 7 is coated with a film that is high reflection to the oscillating laser. The first plano-concave lens 8 is coated with a film that is high reflection to both the oscillating laser and the frequency-doubled laser. The second plano-concave lens 10 is coated with a film that is partial transmission to the fundamental laser and high transmission high transmission to the frequency-doubled laser, and is an output coupler of the single-frequency laser 1. The Nd:YVO$_4$ laser crystal 4 is a gain crystal of the single-frequency laser 1. The frequency-doubling crystal 9 is inserted to obtain a more stable single-frequency laser output. The laser generated by the single-frequency laser 1 is injected into the power meter 2.

Example 2

Figure 4:
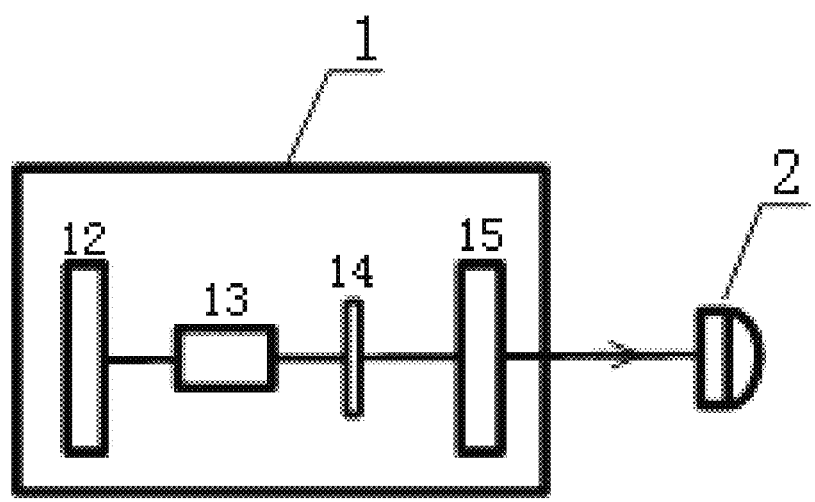
FIG. 4 is a structural diagram of a device for measuring a thermal load caused by ETU in a laser gain crystal in a standing-wave cavity according to the present invention.

FIG. 4 is a structural diagram of a device for measuring a thermal load caused by ETU in a laser gain crystal in a standing-wave cavity according to the present invention. The device includes a single-frequency laser 1 and a power meter 2. The tested laser gain crystal covered with indium foil is placed in a temperature-controlled red copper oven through vacuum indium welding, and then placed in a laser resonant cavity. The temperature-controlled oven uses a TEC for temperature control, with a temperature control accuracy of 0.1° C. The single-frequency laser 1 has a standing-wave cavity structure, and an etalon is inserted into the standing-wave cavity structure. Through the mode selection of the etalon, the single-frequency output of the laser is realized. As shown in FIG. 4, the single-frequency laser 1 includes a concave-convex lens 12, a laser crystal 13, an etalon 14, and a concave-convex lens 15. The concave-convex lens 12 and the plano-concave lens 15 are two optical lenses forming the standing-wave cavity, the concave-convex lens 12 is coated with a film that is high transmission to the pump laser and high reflection to the oscillating laser, and the plano-concave lens 15 is coated with a film that is partial transmission to the oscillating laser. The laser generated by the single-frequency laser 1 is injected into the power meter 2.

Example 3

The tested Nd:YVO$_4$ laser gain crystal is a composite crystal with a size of 3*3*(5+15) mm$^3$, of which 5 mm is an undoped part and 15 mm is a part with 0.3% doping concentration. Both ends of the crystal are plated with an 880/1064/1342 nm anti-reflection film, with a 1.5-degree wedge angle at the second end face. The single-frequency laser 1 has an 8-shaped ring structure. The first concave-convex lens 3 is coated with a film that is high transmission to the pump laser and high reflection to the oscillating laser, with a radius of curvature of 1500 mm. The first plano-convex lens 7 is coated with a film that is high reflection to the fundamental frequency laser, with a radius of curvature of 1500 mm. The first plano-concave lens 8 is coated with a film that is high reflection to both the fundamental frequency laser and the frequency-doubled laser, with a radius of curvature of −100 mm. The second plano-concave lens 10 is coated with a film that is high reflection to some of the fundamental frequency laser, with a reflectivity of 0.5% and a radius of curvature of −100 mm. When the injected pump power is increased to 45.3 W, there is a laser output. According to the following formula:

$$|A_t+D_t| \leq 2 \ \& \ |A_s+D_s| \leq 2 \quad (5)$$

a thermal load at the threshold is 20.5%. According to the following formula:

$$\xi_{ETU} = \frac{\lambda_f}{\lambda_P}\left[\xi_{nolasing} - \left(1 - \frac{\lambda_P}{\lambda_f}\right)\right]$$

a thermal load caused by ETU at the threshold is 6.8%. $\lambda_f$=1032 nm and $\lambda_P$=880 nm.

In the above calculation, the thermal conductivity $K_{\parallel c}$ parallel to the optical axis is 5.23 W/m/K, the thermal conductivity $K_{\perp c}$ perpendicular to the optical axis is 5.1 W/m/K, the spot size $\omega_P$ of the pump laser at the laser crystal is 510 the thermo-optic coefficient $$\frac{dn}{dT}$$

is $3*10^{-6}$/K, the absorption coefficient α of the laser crystal to the pump laser is 1.5/cm, and the effective length l of the doped part of the laser gain crystal is 15 mm. The same method can be used to measure the thermal load caused by ETU in the laser gain crystal under different output coupling lenses.

Each example of the present specification is described in a progressive manner, each example focuses on the difference from other examples, and the same and similar parts between the examples may refer to each other.

Several examples are used herein for illustration of the principles and implementations of the present invention. The description of the foregoing examples is used to help illustrate the method of the present invention and the core principles thereof. In addition, those of ordinary skill in the art can make various modifications in terms of specific implementations and scope of application in accordance with the teachings of the present invention. In conclusion, the content of the present specification shall not be construed as a limitation to the present invention.

What is claimed is:

1. A method for measuring a thermal load caused by ETU in a laser gain crystal, wherein the method uses a device for measuring a thermal load caused by ETU in a laser gain crystal, and the device comprises a single-frequency laser and a power meter, wherein an output from the single-frequency laser is injected into the power meter, and an output power of the single-frequency laser be measured by the power meter; and wherein the method comprises the following steps:
increasing pump power of the single frequency laser from a predetermined initial power value till the single-frequency laser emits light, recording a pump power value at this moment as a pump power threshold; and repeating the increasing and the recording to obtain multiple pump power thresholds;

calculating an average pump power threshold based on the multiple pump power thresholds;
obtaining cavity parameters of an optical resonant cavity of the single-frequency laser;
obtaining thermal focal lengths on the tangential plane and sagittal plane of the laser gain crystal inside the single-frequency laser by substituting the average pump power threshold and the cavity parameters into thermal lens focal length formulas for the tangential plane and the sagittal plane;
obtaining individual ABCD transfer matrices of the laser gain crystal on the tangential plane and the sagittal plane based on the thermal focal length on the tangential plane, the thermal focal length on the sagittal plane, and the cavity parameters;
obtaining a first thermal load at the average pump power threshold based on the ABCD transfer matrix of the laser gain crystal on the tangential plane, the ABCD transfer matrix of the laser gain crystal on the sagittal plane, the average pump power threshold, and stability conditions of the optical resonant cavity; and
obtaining a second thermal load caused by ETU at the average pump power threshold based on the first thermal load at the average pump power threshold.

2. A method for measuring a thermal load caused by ETU in a laser gain crystal according to claim 1, wherein the laser gain crystal is an Nd:YVO4 crystal.

3. A method for measuring a thermal load caused by ETU in a laser gain crystal according to claim 1, wherein the optical resonant cavity of the single-frequency laser is a standing-wave cavity or a traveling-wave cavity.

4. The method for measuring a thermal load caused by ETU in a laser gain crystal according to claim 1, wherein the obtaining thermal focal lengths on the tangential plane and sagittal plane of the laser gain crystal inside the single-frequency laser by substituting the average pump power threshold and the cavity parameters into thermal lens focal length formulas for the tangential plane and the sagittal plane specifically comprises:

obtaining the thermal focal length $f_{t(thermal)}$ on the tangential plane of the laser gain crystal according to the thermal lens focal length formula for the tangential plane $$f_{t(thermal)} = \frac{\pi K_{\parallel c} \omega_p^2}{\xi P_P \frac{dn}{dT}[1-\exp(-\alpha l)]};$$

and
obtaining the thermal focal length on the sagittal plane of the laser gain crystal according to the thermal lens focal length formula for the sagittal plane $$f_{s(thermal)} = \frac{\pi K_{\perp c} \omega_p^2}{\xi P_P \left(\frac{dn}{dT} + 0.85 \times 10^{-6}\right)[1-\exp(-\alpha l)]},$$

wherein
$K_{\parallel c}$ and $K_{\perp c}$ represent the thermal conductivity coefficients, which were parallel and perpendicular to the optical axis, respectively, $\omega_P$ represents the spot size of the pump laser at the laser crystal, ξ represents the thermal load, $P_P$ represents the pump threshold of the laser system, $\frac{dn}{dT}$ represents the thermo-optic coefficient of the laser crystal, α represents the pump laser absorption coefficient of the laser crystal, l represents the effective length of a doped part of the laser gain crystal $f_{t(thermal)}$ represents the thermal focal length on the tangential plane of the laser gain crystal, and $f_{s(thermal)}$ represents the thermal focal length on the sagittal plane of the laser gain crystal.

5. The method for measuring a thermal load caused by ETU in a laser gain crystal according to claim 1, wherein the obtaining thermal focal lengths on the tangential plane and sagittal plane of the laser gain crystal inside the single-frequency laser by substituting the average pump power threshold and the cavity parameters into thermal lens focal length formulas for the tangential plane and the sagittal plane specifically comprises:

obtaining the thermal focal length $f_{t(thermal)}$ on the tangential plane of the laser gain crystal according to the thermal lens focal length formula for the tangential plane $$f_{t(thermal)} = \frac{\pi K_{\parallel c}\omega_p^2}{\xi P_P \frac{dn}{dT}[1-\exp(-\alpha l)]};$$

and
obtaining the thermal focal length on the sagittal plane of the laser gain crystal according to the thermal lens focal length formula for the sagittal plane $$f_{s(thermal)} = \frac{\pi K_{\perp c}\omega_p^2}{\xi P_P \left(\frac{dn}{dT}+0.85\times 10^{-6}\right)[1-\exp(-\alpha l)]},$$

wherein
$K_{\parallel c}$ and $K_{\perp c}$ represent the thermal conductivity coefficients, which were parallel and perpendicular to the optical axis, respectively, $\omega_P$ represents the spot size of the pump laser at the laser crystal, ξ represents the thermal load, $P_P$ represents the pump threshold of the laser system, $\frac{dn}{dT}$ represents the thermo-optic coefficient of the laser crystal, α represents the pump laser absorption coefficient of the laser crystal, l represents the effective length of a doped part of the laser gain crystal $f_{t(thermal)}$ represents the thermal focal length on the tangential plane of the laser gain crystal, and $f_{s(thermal)}$ represents the thermal focal length on the sagittal plane of the laser gain crystal.

6. The method for measuring a thermal load caused by ETU in a laser gain crystal according to claim 2, wherein the obtaining thermal focal lengths on the tangential plane and the sagittal plane of the laser gain crystal inside the single-frequency laser by substituting the average pump power threshold and the cavity parameters into thermal lens focal length formulas for the tangential plane and the sagittal plane specifically comprises:

obtaining the thermal focal length $f_{t(thermal)}$ on the tangential plane of the laser gain crystal according to the thermal lens focal length formula for the tangential plane $$f_{t(thermal)} = \frac{\pi K_{\parallel c}\omega_p^2}{\xi P_P \frac{dn}{dT}[1-\exp(-\alpha l)]};$$

and
obtaining the thermal focal length on the sagittal plane of the laser gain crystal according to the thermal lens focal length formula for the sagittal plane $$f_{s(thermal)} = \frac{\pi K_{\perp c}\omega_p^2}{\xi P_P \left(\frac{dn}{dT}+0.85\times 10^{-6}\right)[1-\exp(-\alpha l)]},$$

wherein
$K_{\parallel c}$ and $K_{\perp c}$ represent the thermal conductivity coefficients, which were parallel and perpendicular to the optical axis, respectively, $\omega_P$ represents the spot size of the pump laser at the laser crystal, ξ represents the thermal load, $P_P$ represents the pump threshold of the laser system $\frac{dn}{dT}$ represents the thermo-optic coefficient of the laser crystal, α represents the pump laser absorption coefficient of the laser crystal, l represents the effective length of a doped part of the laser gain crystal $f_{t(thermal)}$ represents the thermal focal length on the tangential plane of the laser gain crystal, and $f_{s(thermal)}$ represents the thermal focal length on the sagittal plane of the laser gain crystal.

7. The method for measuring a thermal load caused by ETU in a laser gain crystal according to claim 3, wherein the obtaining thermal focal lengths on the tangential plane and the sagittal plane of the laser gain crystal inside the single-frequency laser by substituting the average pump power threshold and the cavity parameters into thermal lens focal length formulas for the tangential plane and the sagittal plane specifically comprises:

obtaining the thermal focal length $f_{t(thermal)}$ on the tangential plane of the laser gain crystal according to the thermal lens focal length formula for the tangential plane $$f_{t(thermal)} = \frac{\pi K_{\parallel c}\omega_p^2}{\xi P_P \frac{dn}{dT}[1-\exp(-\alpha l)]};$$

and
obtaining the thermal focal length on the sagittal plane of the laser gain crystal according to the thermal lens focal length formula for the sagittal plane $$f_{s(thermal)} = \frac{\pi K_{\perp c}\omega_p^2}{\xi P_P\left(\frac{dn}{dT} + 0.85\times 10^{-6}\right)[1-\exp(-\alpha l)]},$$

wherein $K_{\parallel c}$ and $K_{\perp c}$ represent the thermal conductivity coefficients, which were parallel and perpendicular to the optical axis, respectively, $\omega_p$ represents the spot size of the pump laser at the laser crystal, represents the thermal load, $P_P$ represents the pump threshold of the laser system, $$\frac{dn}{dT}$$

represents the thermo-optic coefficient of the laser crystal, $\alpha$ represents the pump laser absorption coefficient of the laser crystal, l represents the effective length of a doped part of the laser gain crystal $f_{t(thermal)}$ represents the thermal focal length on the tangential plane of the laser gain crystal, and $f_{s(thermal)}$ represents the thermal focal length on the sagittal plane of the laser gain crystal.

8. The method for measuring an thermal load caused by ETU in a laser gain crystal according to claim 4, wherein the obtaining individual ABCD transfer matrices of the laser gain crystal on the tangential plane and the sagittal plane based on the thermal focal length on the tangential plane, the thermal focal length on the sagittal plane, and the cavity parameters specifically comprises:

obtaining the ABCD transfer matrix $$\begin{pmatrix} A_t & B_t \\ C_t & D_t \end{pmatrix}$$

of the laser gain crystal on the tangential plane based on the thermal focal length on the tangential plane and the cavity parameters by using the formula $$\begin{pmatrix} A_t & B_t \\ C_t & D_t \end{pmatrix} = \begin{pmatrix} a_t & b_t \\ c_t & d_t \end{pmatrix}\begin{pmatrix} 1 & 0 \\ -\frac{1}{f_{t(thermal)}} & 1 \end{pmatrix};$$

and
obtaining the ABCD transfer matrix $$\begin{pmatrix} A_s & B_s \\ C_s & D_s \end{pmatrix}$$

of the laser gain crystal on the sagittal plane based on the thermal focal length on the sagittal plane and the cavity parameters by using the formula $$\begin{pmatrix} A_s & B_s \\ C_s & D_s \end{pmatrix} = \begin{pmatrix} a_s & b_s \\ c_s & d_s \end{pmatrix}\begin{pmatrix} 1 & 0 \\ -\frac{1}{f_{s(thermal)}} & 1 \end{pmatrix},$$

wherein $$\begin{pmatrix} A_t & B_t \\ C_t & D_t \end{pmatrix}$$

represents the ABCD transfer matrix of the laser gain crystal on the tangential plane, $$\begin{pmatrix} A_s & B_s \\ C_s & D_s \end{pmatrix}$$

represents the ABCD transfer matrix of the laser gain crystal on the sagittal plane, $f_{t(thermal)}$ represents the thermal focal length on the tangential plane of the laser gain crystal $f_{s(thermal)}$ represents the thermal focal length on the sagittal plane of the laser gain crystal, $$\begin{pmatrix} a_t & b_t \\ c_t & d_t \end{pmatrix}$$

is an expression for the remaining optical transmission matrix on the tangential plane; and $$\begin{pmatrix} a_s & b_s \\ c_s & d_s \end{pmatrix}$$

is an expression for the remaining optical transmission matrix on the sagittal plane.

9. The method for measuring an thermal load caused by ETU in a laser gain crystal according to claim 5, wherein the obtaining individual ABCD transfer matrices of the laser gain crystal on the tangential plane and the sagittal plane based on the thermal focal length on the tangential plane, the thermal focal length on the sagittal plane, and the cavity parameters specifically comprises:

obtaining the ABCD transfer matrix $$\begin{pmatrix} A_t & B_t \\ C_t & D_t \end{pmatrix}$$

of the laser gain crystal on the tangential plane based on the thermal focal length on the tangential plane and the cavity parameters by using the formula $$\begin{pmatrix} A_t & B_t \\ C_t & D_t \end{pmatrix} = \begin{pmatrix} a_t & b_t \\ c_t & d_t \end{pmatrix}\begin{pmatrix} 1 & 0 \\ -\frac{1}{f_{t(thermal)}} & 1 \end{pmatrix};$$

and
obtaining the ABCD transfer matrix $$\begin{pmatrix} A_s & B_s \\ C_s & D_s \end{pmatrix}$$

of the laser gain crystal on the sagittal plane based on the thermal focal length on the sagittal plane and the cavity parameters by using the formula $$\begin{pmatrix} A_s & B_s \\ C_s & D_s \end{pmatrix} = \begin{pmatrix} a_s & b_s \\ c_s & d_s \end{pmatrix} \begin{pmatrix} 1 & 0 \\ -\dfrac{1}{f_{s(thermal)}} & 1 \end{pmatrix},$$

wherein $$\begin{pmatrix} A_t & B_t \\ C_t & D_t \end{pmatrix}$$

represents the ABCD transfer matrix of the laser gain crystal on the tangential plane, $$\begin{pmatrix} A_s & B_s \\ C_s & D_s \end{pmatrix}$$

represents the ABCD transfer matrix of the laser gain crystal on the sagittal plane, $f_{t(thermal)}$ represents the thermal focal length on the tangential plane of the laser gain crystal $f_{s(thermal)}$ represents the thermal focal length on the sagittal plane of the laser gain crystal, $$\begin{pmatrix} a_t & b_t \\ c_t & d_t \end{pmatrix}$$

is the expression for the remaining optical transmission matrices on the tangential plane; and $$\begin{pmatrix} a_s & b_s \\ c_s & d_s \end{pmatrix}$$

is the expression for the remaining optical transmission matrices on the sagittal plane.

10. The method for measuring a thermal load caused by ETU in a laser gain crystal according to claim 6, wherein the obtaining individual ABCD transfer matrices of the laser gain crystal on the tangential plane and the sagittal plane based on the thermal focal length on the tangential plane, the thermal focal length on the sagittal plane, and the cavity parameters specifically comprises:

obtaining the ABCD transfer matrix $$\begin{pmatrix} A_t & B_t \\ C_t & D_t \end{pmatrix}$$

of the laser gain crystal on the tangential plane based on the thermal focal length on the tangential plane and the cavity parameters by using the formula $$\begin{pmatrix} A_t & B_t \\ C_t & D_t \end{pmatrix} = \begin{pmatrix} a_t & b_t \\ c_t & d_t \end{pmatrix} \begin{pmatrix} 1 & 0 \\ -\dfrac{1}{f_{t(thermal)}} & 1 \end{pmatrix};$$

and
obtaining the ABCD transfer matrix $$\begin{pmatrix} A_s & B_s \\ C_s & D_s \end{pmatrix}$$

of the laser gain crystal on the sagittal plane based on the thermal focal length on the sagittal plane and the cavity parameters by using the formula $$\begin{pmatrix} A_s & B_s \\ C_s & D_s \end{pmatrix} = \begin{pmatrix} a_s & b_s \\ c_s & d_s \end{pmatrix} \begin{pmatrix} 1 & 0 \\ -\dfrac{1}{f_{s(thermal)}} & 1 \end{pmatrix},$$

wherein $$\begin{pmatrix} A_t & B_t \\ C_t & D_t \end{pmatrix}$$

represents the ABCD transfer matrix of the laser gain crystal on the tangential plane, $$\begin{pmatrix} A_s & B_s \\ C_s & D_s \end{pmatrix}$$

represents the ABCD transfer matrix of the laser gain crystal on the sagittal plane, $f_{t(thermal)}$ represents the thermal focal length on the tangential plane of the laser gain crystal $f_{s(thermal)}$ represents the thermal focal length on the sagittal plane of the laser gain crystal $$\begin{pmatrix} a_t & b_t \\ c_t & d_t \end{pmatrix}$$

is the expression for the remaining optical transmission matrices on the tangential plane; and $$\begin{pmatrix} a_s & b_s \\ c_s & d_s \end{pmatrix}$$

is the expression for the remaining optical transmission matrices on the sagittal plane.

11. The method for measuring a thermal load caused by ETU in a laser gain crystal according to claim 7, wherein the obtaining individual ABCD transfer matrices of the laser gain crystal on the tangential plane and the sagittal plane based on the thermal focal length on the tangential plane, the thermal focal length on the sagittal plane, and the cavity parameters specifically comprises:

obtaining the ABCD transfer matrix $$\begin{pmatrix} A_t & B_t \\ C_t & D_t \end{pmatrix}$$

of the laser gain crystal on the tangential plane based on the thermal focal length on the tangential plane and the cavity parameters by using the formula $$\begin{pmatrix} A_t & B_t \\ C_t & D_t \end{pmatrix} = \begin{pmatrix} a_t & b_t \\ c_t & d_t \end{pmatrix} \begin{pmatrix} 1 & 0 \\ -\frac{1}{f_{t(thermal)}} & 1 \end{pmatrix};$$

and
obtaining the ABCD transfer matrix $$\begin{pmatrix} A_s & B_s \\ C_s & D_s \end{pmatrix}$$

of the laser gain crystal on the sagittal plane based on the thermal focal length on the sagittal plane and the cavity parameters by using the formula $$\begin{pmatrix} A_s & B_s \\ C_s & D_s \end{pmatrix} = \begin{pmatrix} a_s & b_s \\ c_s & d_s \end{pmatrix} \begin{pmatrix} 1 & 0 \\ -\frac{1}{f_{s(thermal)}} & 1 \end{pmatrix};$$

wherein $$\begin{pmatrix} A_t & B_t \\ C_t & D_t \end{pmatrix}$$

represents the ABCD transfer matrix of the laser gain crystal on the tangential plane, $$\begin{pmatrix} A_s & B_s \\ C_s & D_s \end{pmatrix}$$

represents the ABCD transfer matrix of the laser gain crystal on the sagittal plane, $f_{t(thermal)}$ represents the thermal focal length on the tangential plane of the laser gain crystal $f_{s(thermal)}$ represents the thermal focal length on the sagittal plane of the laser gain crystal, $$\begin{pmatrix} a_t & b_t \\ c_t & d_t \end{pmatrix}$$

is the expression for the remaining optical transmission matrices on the tangential plane; and $$\begin{pmatrix} a_s & b_s \\ c_s & d_s \end{pmatrix}$$

is the expression for the remaining optical transmission matrices on the sagittal plane.

12. The method for measuring a thermal load caused by ETU in a laser gain crystal according to claim 8, wherein the obtaining a second thermal load caused by ETU at the average pump power threshold based on the first thermal load at the average pump power threshold specifically comprises:

obtaining the second thermal load caused by ETU at the average pump power threshold $\xi_{ETU}$ based on the first thermal load at the average pump power threshold by using the formula $$\xi_{ETU} = \frac{\lambda_f}{\lambda_P}\left[\xi_{nolasing} - \left(1 - \frac{\lambda_P}{\lambda_f}\right)\right],$$

wherein
$\lambda_P$ represents the wavelength of the pump laser, $\lambda_f$ represents the average pump power threshold of the laser system, $\xi_{ETU}$ represents the second thermal load caused by ETU before the laser is emitted, and $\xi_{nolasing}$ represents the first thermal load before the laser is emitted.

* * * * *